United States Patent
Wang et al.

(10) Patent No.: US 9,532,289 B2
(45) Date of Patent: Dec. 27, 2016

(54) INFORMATION PROCESSING METHOD AND APPARATUS

(71) Applicant: HUAWEI TECHNOLOGIES CO., LTD., Shenzhen, Guangdong (CN)

(72) Inventors: Shukun Wang, Shenzhen (CN); Hongzhuo Zhang, Shanghai (CN); Li Ji, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 14/051,751

(22) Filed: Oct. 11, 2013

(65) Prior Publication Data

US 2014/0038612 A1 Feb. 6, 2014

Related U.S. Application Data (63) Continuation of application No. PCT/CN2012/073940, filed on Apr. 12, 2012.

(30) Foreign Application Priority Data

Apr. 12, 2011 (CN) .......................... 2011 1 0091121

(51) Int. Cl.
*H04W 36/00* (2009.01)
*H04W 36/30* (2009.01)

(52) U.S. Cl.
CPC ......... *H04W 36/30* (2013.01); *H04W 36/0083* (2013.01)

(58) Field of Classification Search
CPC ............. H04W 36/30; H04W 36/0083; H04W 36/0016; H04W 36/0061; H04W 36/0055; H04W 36/0088; H04W 36/14; H04W 72/085; H04L 5/001; H04L 5/0023; H04L 5/0048
See application file for complete search history.

(56) References Cited

U.S. PATENT DOCUMENTS 5,781,861 A 7/1998 Kang et al.
2009/0323638 A1* 12/2009 Catovic ............ H04W 36/0083
370/331

(Continued)

FOREIGN PATENT DOCUMENTS

| CN | 101404814 | 4/2009 |
| CN | 101730065 | 6/2010 |

(Continued)

OTHER PUBLICATIONS

*3rd Generation Partnership Project; Technical Specification Group Radio Access Network; Evolved Universal Terrestrial Radio Access (E-UTRA); Requirements for support of radio resource management (Release 10)*, 3GPP TS 36.133 V10.2.0, Apr. 2011, pp. 1-419.

(Continued)

*Primary Examiner* — Quan M Hua
(74) *Attorney, Agent, or Firm* — Staas & Halsey LLP (57) ABSTRACT

Embodiments of the present invention provide an information processing method and apparatus. The method includes: sending a communication message that includes instruction information to a UE, so that the UE records multiple times, according to the instruction information, signal quality parameters of cells measured by the UE; after a connection is established between the UE and a target base station, receiving the signal quality parameters of the cells measured by the UE, recorded by the UE multiple times and sent by the target base station; and adjusting handover parameters according to the received signal quality parameters, where the signal quality parameters of the cells measured by the UE are sent by the UE to the target base station.

16 Claims, 3 Drawing Sheets

(56) References Cited

U.S. PATENT DOCUMENTS

| | | | | |
|---|---|---|---|---|
| 2010/0124173 A1* | 5/2010 | Agashe | ............ | H04W 36/0083 370/245 |
| 2011/0256833 A1* | 10/2011 | Racz | .................... | H04W 24/08 455/63.1 |
| 2012/0088507 A1* | 4/2012 | Legg | .................. | H04W 36/245 455/436 |

FOREIGN PATENT DOCUMENTS

| | | |
|---|---|---|
| CN | 101841835 | 9/2010 |
| CN | WO 2010/121418 | * 10/2010 |

OTHER PUBLICATIONS

International Search Report and Written Opinion, dated Jul. 19, 2012, in corresponding International Application No. PCT/CN2012/073940 (12 pp.)

International Search Report mailed Jul. 19, 2011 in corresponding International Application No. PCT/CN2012/073940.

* cited by examiner

INFORMATION PROCESSING METHOD AND APPARATUS

CROSS-REFERENCE TO RELATED APPLICATIONS

This application is a continuation of International Application No. PCT/CN2012/073940, filed on Apr. 12, 2012, which claims priority to Chinese Patent Application No. 201110091121.8, filed on Apr. 12, 2011, both of which are hereby incorporated by reference in their entireties.

TECHNICAL FIELD

Embodiments of the present invention relate to the field of communications technologies, and in particular, to an information processing method and apparatus.

BACKGROUND

In a 3GPP long term evolution (Long Term Evolution, abbreviated as LTE) system, a handover process is hard handover triggered by a network side and assisted by a user equipment (User Equipment, abbreviated as UE).

In the LTE system, the UE performs signal measurement, while the network side makes a handover decision. Specifically, a source base station (eNB) where a source cell is located configures a UE to perform signal quality measurement in a serving cell and a neighboring cell, and configures the UE to report measurement results to the source eNB when the signal quality in the neighboring cell meets a handover condition, and then the source eNB performs handover, where the handover condition is generally as follows: after a signal of the neighboring cell measured by the UE is filtered, the filtered signal always reaches a reporting threshold within a time period.

The setting of this reporting threshold directly affects the handover performance; if the reporting threshold is high, the handover may be performed late; if the reporting threshold is low, the handover may be performed early. Early handover or late handover increases the number of handovers or the number of call drops, thereby weakening the mobility performance. Therefore, it is necessary to provide a solution with high handover reliability.

SUMMARY

Embodiments of the present invention provide an information processing method and apparatus to increase handover reliability.

An embodiment of the present invention provides an information processing method, including:

sending a communication message that includes instruction information to a UE, so that the UE records multiple times, according to the instruction information, signal quality parameters of cells measured by the UE; and after establishing a connection between the UE and a target base station, receiving the signal quality parameters of the cells measured by the UE, recorded by the UE multiple times and sent by the target base station, and adjusting handover parameters according to the received signal quality parameters;

where the signal quality parameters of the cells measured by the UE are sent by the UE to the target base station.

An embodiment of the present invention also provides an information processing method, including:

receiving a communication message that includes instruction information sent by a source base station;

recording multiple times, according to the instruction information, signal quality parameters of cells measured by a UE; and sending the signal quality parameters of the cells measured by the UE and recorded multiple times to the target base station in a process or upon the completion of establishing a connection between the UE and a target base station, so that the target base station sends the signal quality parameters of the cells measured by the UE and recorded multiple times to the source base station.

An embodiment of the present invention provides a base station, including:

a first sending module, configured to send a communication message that includes instruction information to a UE, so that the UE records multiple times, according to the instruction information, signal quality parameters of cells measured by the UE; and a report receiving module, configured to: after a connection is established between the UE and a target base station, receive the signal quality parameters of the cells measured by the UE, recorded by the UE multiple times, and sent by the target base station, and adjust handover parameters according to the received signal quality parameters, where the signal quality parameters of the cells measured by the UE are sent by the UE to the target base station.

An embodiment of the present invention provides a user equipment, including:

a receiving module, configured to receive a communication message that includes instruction information and sent by a source base station;

a recording module, configured to record multiple times, according to the instruction information, signal quality parameters of cells measured by a UE; and a second sending module, configured to: in a process or upon the completion of establishing a connection between the UE and a target base station, send the signal quality parameters of the cells measured by the UE and recorded multiple times, to the target base station, so that the target base station sends the signal quality parameters of the cells measured by the UE and recorded multiple times, to the source base station.

By using the information processing method and apparatus provided in the embodiments of the present invention, a source base station sends a communication message that includes instruction information to a UE, so that the UE records multiple times, according to the instruction information, signal quality parameters of cells measured by the UE. In this way, after a connection is established between the UE and a target base station, the source base station can receive the signal quality parameters of the cells measured by the UE, recorded by the UE multiple times and sent by the target base station. In the embodiments of the present invention, the source base station can adjust handover parameters according to the signal quality parameters of the cells measured by the UE and recorded by the UE multiple times, so that handover reliability and mobility performance can be increased.

BRIEF DESCRIPTION OF DRAWING(S)

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
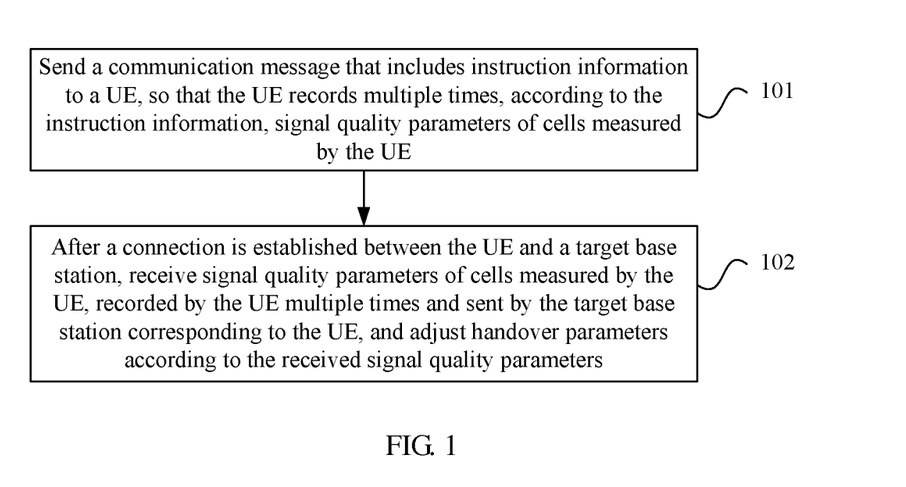
FIG. 1 is a flowchart of a first embodiment of an information processing method according to the present invention.

FIG. 1 is a flowchart of a first embodiment of an information processing method according to the present invention. As shown in FIG. 1, the method includes the following:

Step 101: Send a communication message that includes instruction information to a UE, so that the UE records multiple times, according to the instruction information, signal quality parameters of cells measured by the UE.

The cells measured by the UE may be a serving cell where the current UE is located and a neighboring cell of the serving cell.

An executing entity in this embodiment may be a base station, and in particular, it may be a source base station.

The source base station sends a communication message to a UE served by the source base station, where the communication message may include instruction information that is used to instruct the UE to perform recording multiple times when the UE records signal quality parameters of cells measured by the UE. A recording period and the number of records, or a recording period and duration, or a recording duration, can be notified to the UE by using the instruction information. The signal quality may include RSRP (Reference Signal Receiving Power, reference signal receiving power) and RSRQ (Reference Signal Receiving Quality, reference signal receiving quality). Further, in another implementation manner, the instruction information may be further used to instruct the UE to record and report time information and position information of the UE each time when the UE records the signal quality parameters, so that the source base station can acquire speed information of the UE according to the time information and position information reported by the UE, thereby further optimizing handover parameters.

Specifically, the UE may implement a process of recording signal quality parameters multiple times according to the instruction information. For example, when the instruction information includes or indicates that the recording period is T1 and the number of records is M1, the UE records, according to the instruction information and at intervals of T1, signal quality parameters in the latest M1 measurements; when the instruction information includes or indicates that the recording period is T2 and the recording duration is t2 seconds, the UE records, according to the instruction information and at intervals of T2, signal quality parameters within the latest t2 seconds; when the instruction information includes or indicates that the recording duration is t3 seconds, the UE records, according to the instruction information and at intervals of a recording period set by the UE, signal quality parameters within the latest t3 seconds.

Step 102: After a connection is established between the UE and a target base station, receive signal quality parameters of cells measured by the UE, recorded by the UE multiple times and sent by the target base station corresponding to the UE, and adjust the handover parameters according to the received signal quality parameters, where the signal quality parameters of the cells measured by the UE are sent by the UE to the target base station.

Establishing a connection between the UE and the target base station may be specifically: establishing an RRC (Radio Resource Control, radio resource control protocol) connection between the UE and the target base station, where the RRC connection may be specifically: an RRC connection established between the UE and the target base station when the UE is handed over successfully; or an RRC connection established when the UE and the target base station perform an RRC connection reestablishment after an RLF (Radio Link Failure, abbreviated as RLF) or a handover failure occurs to the UE; or, an RRC connection established when the UE and the target base station perform an RRC connection establishment after an RLF or a handover failure occurs to the UE.

When the UE is handed over successfully, the target base station is a base station to which a target cell where the UE after the successful handover is located belongs; when the UE fails to be handed over or an RLF occurs to the UE, the target base station is a base station to which a target cell with which the UE performs an RRC reestablishment or performs an RRC establishment belongs.

After the UE receives the instruction information sent by the base station in step 101, the UE may record multiple times, according to the instruction information, signal quality parameters of cells measured by the UE; then, if an RLF or a handover failure occurs to the UE, after performing an RRC reestablishment or an RRC establishment with the target base station, the UE may report, according to a requirement of the target base station, the measured signal quality parameters of the cells recorded multiple times, and then the target base station sends the measured signal quality parameters of the cells reported by the UE to the source base station. In this way, the source base station can adjust the handover parameters according to the received signal quality parameters, so that the re-occurrence of an RFL or a handover failure on the UE served by the source serving base station can be effectively avoided. Of course, if the UE is handed over successfully, in a process where the UE is handed over to the target base station or after the UE is handed over to the target base station, the UE may actively report the measured signal quality of the cells recorded multiple times to the target base station or the UE may report, according to a requirement of the target base station, the measured signal quality parameters of the cells recorded multiple times to the target base station, and then the target base station sends the measured signal quality parameters of the cells reported by the UE to the source base station, so that the occurrence of an RFL or a handover failure on the UE served by the source serving base station can be effectively avoided In the embodiment of the present invention, a source base station sends a communication message that includes instruction information to a UE, so that the UE records multiple times, according to the instruction information, measured signal quality parameters of cells. In this way, after the UE establishes a connection with a target base station, the source base station can receive the measured signal quality parameters of cells, recorded by the UE multiple times and sent by the target base station, and then adjust handover parameters according to the received signal quality parameters recorded multiple times. By using the signal quality parameters recorded multiple times, the source base station can obtain a change rule of the signal difference between a source cell and a target cell before the UE performs a mobility related action (an RLF, or a handover failure, or a handover success) and adjust the handover parameters according to the rule. For example, if finding that a signal difference between the target cell and the source cell always meets an A3 event after the signal difference meets the A3 event for the first time, the source base station may reduce a TTT (time to trigger), so that the UE can be handed over timely to the target cell, thereby reducing the rate of a handover failure and increasing the mobility performance.

Figure 2:
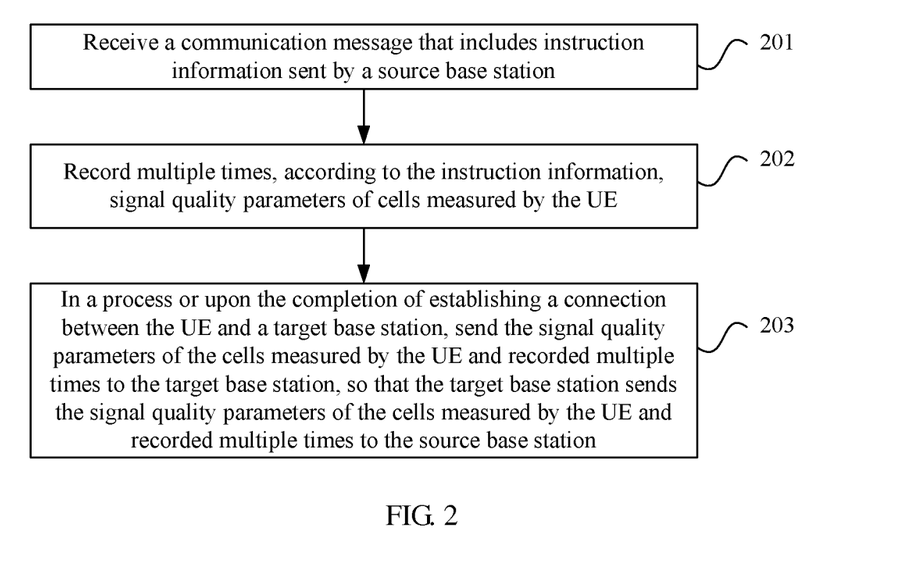
FIG. 2 is a flowchart of a second embodiment of an information processing method according to the present invention.

FIG. 2 is a flowchart of a second embodiment of an information processing method according to the present invention. As shown in FIG. 2, the method includes the following:

Step 201: Receive a communication message that includes instruction information sent by a source base station.

This embodiment corresponds to the embodiment illustrated in FIG. 1, and an executing entity in this embodiment may be a UE.

The UE receives a communication message sent by the source base station, where the communication message includes instruction information. For details about the instruction information, reference may be made to the description in step 101.

Step 202: Record multiple times, according to the instruction information, signal quality parameters of cells measured by the UE.

The UE records multiple times, according to the instruction information, signal quality parameters of cells measured by the UE, that is, the UE records, according to a recording period indicated in the instruction information, signal quality in a serving cell and a neighboring cell periodically, and stores, according to a the number of records indicated in the instruction information, signal quality recorded in the preset number of records. For example, if the number of records indicated in the instruction information is N, the UE stores signal quality recorded in the latest N records. For specific details about the process where the UE performs recording multiple times according to the instruction information, reference may be made to the description in step 101 in the embodiment illustrated in FIG. 1.

Step 203: Send the signal quality parameters of the cells measured by the UE and recorded multiple times to the target base station in a process or upon the completion of establishing a connection between the UE and a target base station, so that the target base station sends the signal quality parameters of the cells measured by the UE and recorded multiple times to the source base station.

Sending the signal quality parameters of the cells measured by the UE and recorded multiple times to the target base station in a process or upon the completion of establishing a connection between the UE and the target base station may be specifically: sending the signal quality parameters of the cells measured by the UE and recorded multiple times to the target base station in a process or upon the completion of establishing an RRC connection between the UE and the target base station, where the RRC connection may be specifically: an RRC connection established between the UE and the target base station after the UE is handed over successfully; or, an RRC connection established when the UE and the target base station perform an RRC reestablishment after an RLF or a handover failure occurs to the UE; or, an RRC connection established when the UE and the target base station perform an RRC establishment after an RLF or a handover failure occurs to the UE.

If an RLF or a handover failure occurs to the UE, the UE may perform a connection reestablishment with the target base station, and then the UE reports, according to a requirement of the target base station, the signal quality parameters of the cells measured by the UE and recorded multiple times; or the UE may report, according to a requirement of the target base station, the signal quality parameters of the cells measured by the UE and recorded multiple times during the successful handover of the UE to the target base station or after the UE is handed over to the target base station successfully; then, the target base station may send the signal quality parameters of the cells measured by the UE, recorded multiple times, and reported by the UE, to the source serving base station, so that the source serving base station can adjust handover parameters according to the signal quality parameters that are recorded multiple times, thereby effectively avoiding the occurrence of an RLF or a handover failure on the UE served by the source serving base station.

In the embodiment of the present invention, a UE receives a communication message that includes instruction information sent by a source base station; then, the UE records multiple times, according to the instruction information, signal quality parameters of cells measured by the UE. In this way, the UE can send the signal quality parameters of the cells measured by the UE and recorded multiple times to a target base station in a process or upon the completion of establishing a connection between the UE and the target base station, so that the source base station can adjust handover parameters according to the signal quality parameters recorded multiple times and sent by the target base station. In the embodiment of the present invention, because the UE records multiple times the signal quality parameters of the cells measured by the UE, the source base station can adjust handover parameters according to the signal quality parameters of the cells measured by the UE and recorded by the UE multiple times, so that the handover reliability and mobility performance can be increased.

Figure 3:
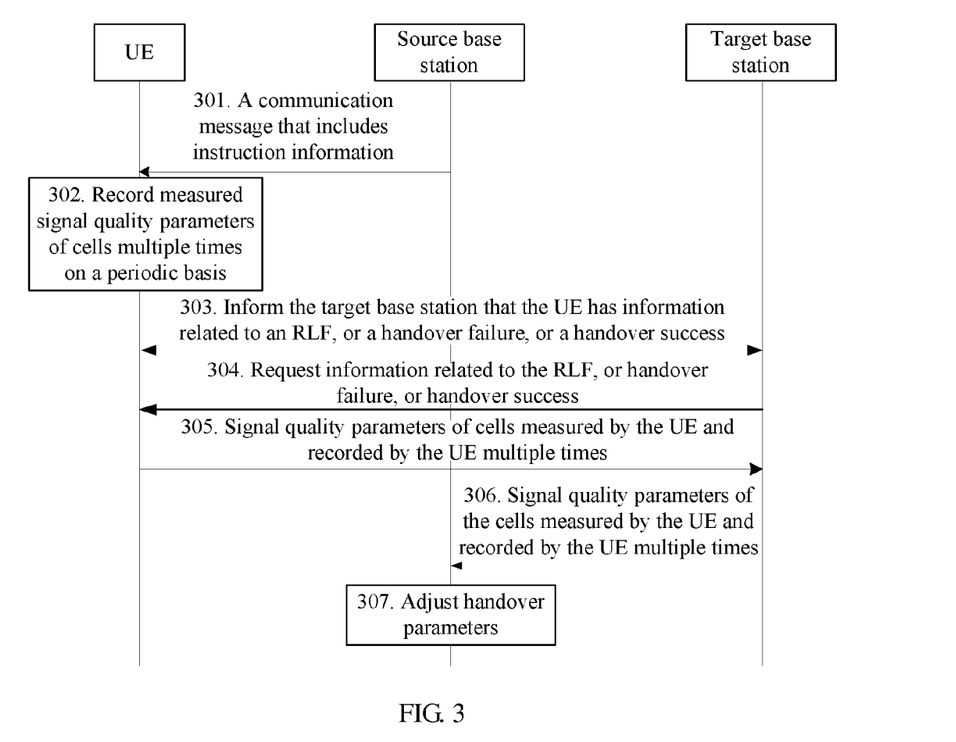
FIG. 3 is a signaling diagram of a third embodiment of an information processing method according to the present invention.

FIG. 3 is a signaling diagram of a third embodiment of an information processing method according to the present invention. As shown in FIG. 3, the method includes the following:

Step 301: A source base station sends a communication message that includes instruction information to a UE.

The communication message, for example, may be an RRC connection reconfiguration (RRC Connection Reconfiguration) message. Instruction information is added to the communication message, where the instruction information is used to instruct to record multiple times signal quality parameters of cells measured by the UE.

The instruction information may include a recording period and the number of records; or the instruction information may include a recording period and a recording duration; or the instruction information may include a recording duration; or the instruction information may include an instruction identifier, where the instruction identifier is used to instruct the UE to record multiple times, according to set recording information, signal quality parameters of cells measured by the UE, where the recording information may include a recording period and the number of records, or a recording period and a recording duration, or a recording duration.

Specifically, the instruction identifier may be 1 bit (bit) information. For example, 0 indicates that a mode of recording once in the prior art is used, and 1 indicates that a mode of recording multiple times in the present invention is used. In the mode of recording multiple times, a recording period and the number of records, or a recording period and a recording duration, or a recording duration can be pr-configured for the UE. In another implementation manner, the instruction identifier may be an event, where the event indicates that the mode of recording multiple times in the present invention is used, and in the mode of recording multiple times, the recording period and the number of records, or the recording period and the recording duration, or the recording duration can be pr-configured for the UE.

The recording period may be a predetermined numerical value, that is, a first period; all UEs served by the source base station can use the first period. Or, the recording period may be N times a reporting period of the UE, where the reporting period is a reporting period from a physical layer to a radio resource management layer (L1-L3) of the UE and N is an integer greater than or equal to 1. Different UEs may have different reporting periods, and each UE can obtain a recording period according to its respective reporting period.

Further, when the recording period is N times the reporting period of the UE, the instruction information is further used to instruct the UE to record and report time information each time when the UE records the signal quality parameters, or the instruction information is further used to instruct the UE to report the reporting period of the UE. Each UE may have a different reporting period, and the source base station does not learn a reporting period of each UE. In this case, when the source base station subsequently receives signal quality parameters recorded by the UE multiple times, the source base station needs to learn a time interval between these signal quality parameters. Therefore, each time when the UE records signal quality parameters, the UE also records current time information, and reports the information to the source base station through the target base station. In this way, the source base station can acquire measurement time corresponding to each signal quality parameter, and further learn a time interval between any two signal quality parameters. Or, the UE directly reports the reporting period of the UE to the source base station through the target base station, so that the source base station can learn a time interval between any two signal quality parameters.

Further, in another implementation manner, the instruction information may be further used to instruct the UE to record and report time information and position information of the UE each time when the UE records the signal quality parameters, so that the source base station can acquire speed information of the UE according to the time information and position information reported by the UE, thereby further optimizing the handover parameters.

The number of records is at least two, that is, the UE needs to record the measured signal quality parameters of the cells at least twice.

When the instruction information carries a recording duration or when the UE records signal quality within a preset duration according to the instruction identifier, the recording period may be preset by the UE, where the preset period may alternatively be equal to the period of L1-L3 reporting by default.

Step 302: The UE records multiple times, according to the received instruction information, measured signal quality parameters of cells on a periodic basis.

After receiving the communication message sent by the source base station, the UE acquires the instruction information from the communication message, and then records multiple times, according to the instruction of the instruction information, the measured signal quality parameters of cells. For example, when the number of records is k, the UE may perform recording by using a caching manner, and store the signal quality parameters recorded in the latest k records in a cache all the time. Each time when there are new signal quality parameters, the UE performs update by using a manner of replacing the oldest signal quality parameters with the latest signal quality parameters; if the recording duration is t seconds, the UE may start a timer, and then store signal quality parameters recorded within the latest t seconds in the cache all the time; each time when there are new signal quality parameters, the UE performs update by using a manner of replacing the oldest signal quality parameters with the latest signal quality parameters.

It should be noted that, when the source base station indicates that the recording period of the UE is N times the period of L1-L3 reporting of the UE, the source base station does not learn a reporting period of each UE. Therefore, in the signal quality parameters recorded, the UE may record a time point corresponding to each signal quality parameter, so that the source base station learns a time point corresponding to each signal quality parameter subsequently; or, the UE may not record the time points corresponding to the signal quality parameters, but sends the period of L1-L3 reporting to the target base station in a subsequent reporting process (included in step 304), and then the target base station sends the reporting period to the source base station.

The following specifically describes, according to the type of instruction information, a process where the UE periodically performs recording multiple times according to the instruction information: case 1: when the instruction information includes or indicates that the recording period is T1 and the number of records is M1, the UE records, according to the instruction information and at intervals of T1, signal quality parameters in the latest M1 measurements; case 2: when the instruction information includes or indicates that the recording period is T2 and the recording duration is t2 seconds, the UE records, according to the instruction information and at intervals of T2, signal quality parameters within the latest t2 seconds; case 3: when the instruction information includes or indicates that the recording duration is t3 seconds, the UE records, according to the instruction information and at intervals of a recording period set by the UE, signal quality parameters within the latest t3 seconds. In the third case, the base station can deduce, according to the recording duration and the number of received records, the recording period preset by the UE.

Step 303: The UE informs the target base station that the UE has information related to an RLF, or a handover failure, or a handover success, when the UE performs a RRC connection reestablishment or when the UE performs a RRC connection establishment with the target base station after an RLF or a handover failure occurs to the UE, or during a successful handover of the UE to the target base station, or after the UE is handed over to the target base station successfully.

If an RLF or a handover failure occurs to the UE, the UE informs the target base station that the UE has information related to the RLF or handover failure in a process where the UE performs an RRC connection reestablishment or an RRC connection establishment with the target base station; or the UE informs the target base station that the UE has information related to the handover success during a successful handover of the UE to the target base station or after the UE is handed over to the target base station successfully.

Step 304: The target base station sends a request message to the UE, where the request message is used to request information related to the RLF or handover failure or handover success.

Step 305: The UE sends the acquired signal quality parameters of cells, which are measured by the UE and recorded by the UE multiple times, to the target base station according to the request of the target base station.

After the RRC connection reestablishment or the RRC establishment is completed, the target base station may acquire, by using an existing process, information related to the RLF, or handover failure, or handover success from the UE, that is, the UE may submit a report about the RLF, or handover failure, or handover success according to the request of the target base station, where the report may include the signal quality parameters of the cells measured by the UE and recorded by the UE multiple times. When the recording period is N times the period of L1-L3 reporting of the UE, the signal quality parameter may further include time information of each record, that is, a time point corresponding to each signal quality, or the signal quality parameter may further include a reporting period of the UE, that is, the period of L1-L3 reporting.

Step 306: The target base station forwards the acquired signal quality parameters of the cells measured by the UE and recorded multiple times to the source base station.

The source base station is a source base station before the RLF, or handover failure, or handover success occurs to the UE. The target base station may forward the report which is about the RLF or handover failure and which includes the signal quality parameters recorded multiple times to the source base station.

Step 307: The source base station adjusts handover parameters according to the signal quality parameters recorded multiple times.

After receiving the report about the RLF, or handover failure, or handover success, the source base station may acquire, according to the signal quality parameters recorded multiple times and time information corresponding to each signal quality parameter, a signal change rule before the RLF, or handover failure, or handover success occurs to the UE, and adjust handover parameters according to the rule.

It should be noted that step 303 to step 305 are a process where the UE reports the signal quality parameters, which are recorded multiple times, according to a requirement of the target base station after the UE completes an RRC connection reestablishment or an RRC connection establishment with the target base station. Step 303 to step 305 in this embodiment are described by using an example that an RLF, or a handover failure, or a handover success occurs to the UE.

In the embodiment of the present invention, a source base station sends a communication message that includes instruction information to a UE, so that the UE records multiple times, according to the instruction information, signal quality parameters of cells measured by the UE. In this way, after the UE establishes a connection with a target base station, the source base station can receive the signal quality parameters of the cells measured by the UE, recorded by the UE multiple times, and sent by the target base station, and then adjust handover parameters according to the received signal quality parameters of the cells recorded multiple times. In the embodiment of the present invention, the serving base station can acquire, according to the signal quality parameters of the cells measured by the UE and recorded by the UE multiple times, a signal change rule before an RLF, or a handover failure, or a handover success occurs to the UE, and adjust handover parameters according to the rule, so that the handover reliability and mobility performance can be increased.

Figure 4:
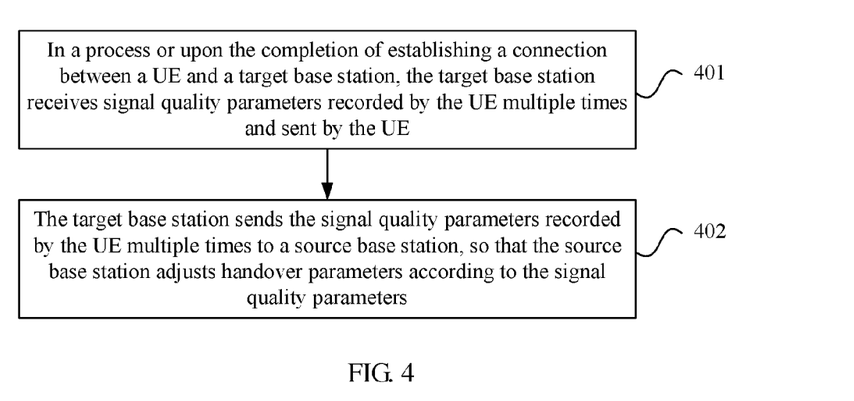
FIG. 4 is a flowchart of a fourth embodiment of an information processing method according to the present invention.

FIG. 4 is a flowchart of a fourth embodiment of an information processing method according to the present invention. As shown in FIG. 4, the method includes the following steps:

Step 401: In a process or upon the completion of establishing a connection between a UE and a target base station, the target base station receives signal quality parameters recorded by the UE multiple times and sent by the UE, where the signal quality parameters are signal quality parameters of cells measured by the UE.

After receiving a communication message that includes instruction information and is sent by a source base station, the UE may record multiple times, according to the instruction information, signal quality parameters of cells measured by the UE; then, in a process or upon the completion of establishing a connection between the UE and the target base station (for example, after an RLF or a handover failure occurs to the UE, or when the UE is handed over successfully), the UE may actively report the signal quality parameters recorded multiple times to the target base station, or the UE may report, according to a request of the target base station, the signal quality parameters recorded multiple times to the target base station.

For details about the specific description of the instruction information and the process where the UE performs recording multiple times and performs reporting according to the instruction information, reference may be made to the description of the foregoing method embodiments, and details are not further described herein again.

Step 402: The target base station sends the signal quality parameters recorded by the UE multiple times to a source base station, so that the source base station adjusts handover parameters according to the signal quality parameters.

After receiving the signal quality parameters recorded multiple times and reported by the UE, the target base station forwards the signal quality parameters recorded multiple times to the source base station, so that the source base station can adjust handover parameters according to the received signal quality parameters recorded multiple times. By using the signal quality parameters recorded multiple times, the source base station can obtain a change rule of the signal difference between a source cell and a target cell before the UE performs a mobility related action, and adjust handover parameters according to the rule, so that the rate of a handover failure can be reduced and mobility performance can be increased.

It is understandable to those skilled in the art that all or some of the steps in the foregoing method embodiments may be implemented by related hardware instructed by a program. The program may be stored in a computer readable storage medium. When the program is executed, the steps of the foregoing method embodiments are involved. The storage medium may be various media that can store program codes, such as a ROM, a RAM, a magnetic disk, or a compact disk.

Figure 5:
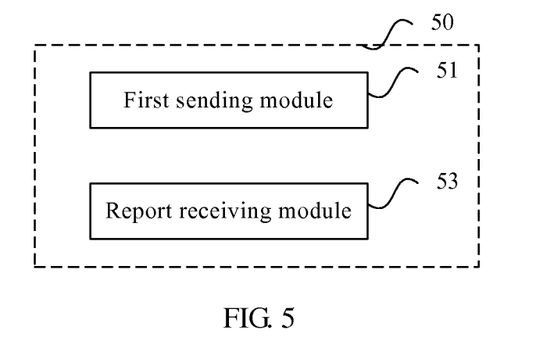
FIG. 5 is a schematic diagram of a first embodiment of a base station according to the present invention.

FIG. 5 is a schematic diagram of a first embodiment of a base station according to the present invention. As shown in FIG. 5, the base station 50 includes a first sending module 51 and a report receiving module 53.

The first sending module 51 is configured to send a communication message that includes instruction information to a UE, so that the UE records multiple times, according to the instruction information, signal quality parameters of cells measured by the UE.

The report receiving module 53 is configured to: after a connection is established between the UE and a target base station, receive signal quality parameters of the cells measured by the UE, recorded by the UE multiple times, and sent by the target base station, and adjust handover parameters according to the received signal quality parameters. The signal quality parameters of the cells measured by the UE are sent by the UE to the target base station.

The base station provided in this embodiment is a source base station of the UE. The base station provided in this embodiment is configured to implement the method embodiments illustrated in FIG. 1 to FIG. 4. For details about the working process and working principle of each module provided in this embodiment, reference may be made to the description of the foregoing method embodiments, and details are not further described herein.

In the embodiment of the present invention, a first sending module of a source base station sends a communication message that includes instruction information to a UE, so that the UE records multiple times, according to the instruction information, measured signal quality parameters of cells. In this way, after the UE establishes a connection with a target base station, a report receiving module of the source base station can receive measured signal quality parameters of cells recorded by the UE multiple times and sent by the target base station, and then the source base station can adjust handover parameters according to the received signal quality parameters that are recorded multiple times. By using the signal quality parameters recorded multiple times, the source base station can obtain a change rule of the signal difference between a source cell and a target cell before the UE performs a mobility related action, and adjust handover parameters according to the rule, so that the UE can be handed over timely to the target cell, thereby reducing the rate of a handover failure and increasing the mobility performance.

Figure 6:
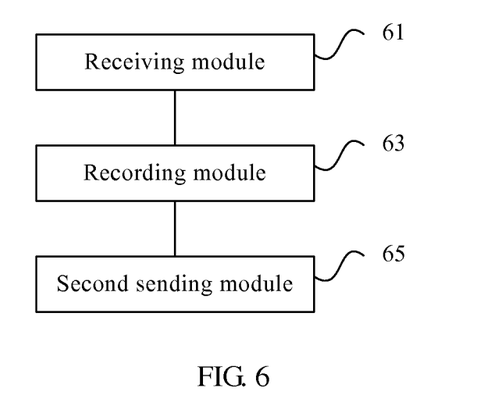
FIG. 6 is a schematic diagram of an embodiment of a user equipment according to the present invention.

FIG. 6 is a schematic diagram of an embodiment of a user equipment (UE) provided in the present invention. As shown in FIG. 6, the UE may include a receiving module 61, a recording module 63, and a second sending module 65.

The receiving module 61 is configured to receive a communication message that includes instruction information and is sent by a source base station.

The recording module 63 is configured to record multiple times, according to the instruction information received by the receiving module 61, signal quality parameters of cells measured by the UE.

The second sending module 65 is configured to: in a process or upon the completion of establishing a connection between the UE and a target base station, send the signal quality parameters of the cells measured by the UE and recorded multiple times to the target base station, so that the target base station sends the signal quality parameters of the cells measured by the UE and recorded multiple times to the source base station.

The UE provided in this embodiment is configured to implement the method embodiments illustrated in FIG. 1 to FIG. 4. For details about the working process and working principle of each module in this embodiment, reference may be made to the description of the foregoing method embodiments, and the details are not further described herein.

In the embodiment of the present invention, a receiving module of a UE receives a communication message that includes instruction information and is sent by a source base station; then, a recording module of the UE records multiple times, according to the instruction information, signal quality parameters of cells measured by the UE. In this way, in a process or upon the completion of establishing a connection between the UE and a target base station, a second sending module of the UE may send the signal quality parameters of the cells measured by the UE and recorded multiple times to the target base station, so that the source base station can adjust handover parameters according to the signal quality parameters recorded multiple times and sent by the target base station. In the embodiment of the present invention, because the UE records multiple times the signal quality parameters of the cells measured by the UE, the source base station can adjust handover parameters according to the signal quality parameters of the cells measured by the UE and recorded by the UE multiple times, so that the handover reliability and mobility performance can be increased.

Figure 7:
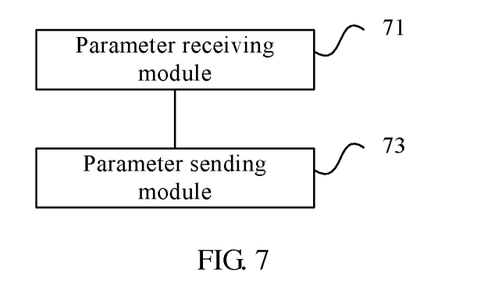
FIG. 7 is a schematic diagram of a second embodiment of a base station according to the present invention.

FIG. 7 is a schematic diagram of a second embodiment of a base station provided in the present invention. As shown in FIG. 7, the base station may include a parameter receiving module 71 and a parameter sending module 73.

The parameter receiving module 71 is configured to, in a process or upon the completion of establishing a connection between a UE and a target base station, receive signal quality parameters recorded by the UE multiple times and sent by the UE. The signal quality parameters are signal quality parameters of cells measured by the UE.

The parameter sending module 73 is configured to send the signal quality parameters recorded by the UE multiple times to a source base station, so that the source base station adjusts handover parameters according to the signal quality parameters.

The base station provided in this embodiment is a target base station of the UE. The base station provided in this embodiment is configured to implement the method embodiments illustrated in FIG. 1 to FIG. 4. For details about the working process and working principle of each module in this embodiment, reference may be made to the description of the foregoing method embodiments, and the details are not further described herein.

In this embodiment, after a parameter receiving module of a target base station receives signal quality parameters recorded multiple times and reported by a UE, a parameter sending module of the target base station forwards the signal quality parameters recorded multiple times to a source base station, so that the source base station can adjust handover parameters according to the received signal quality parameters that are recorded multiple times. By using the signal quality parameters recorded multiple times, the source base station can obtain a change rule of the signal difference between a source cell and a target cell before the UE performs a mobility related action, and adjust handover parameters according to the rule, so that the rate of a handover failure can be reduced and mobility performance can be increased.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications can still be made to the technical solutions described in the foregoing embodiments, or equivalent replacements may be made to some technical features thereof, without departing from the idea and scope of the technical solutions of the embodiments of the present invention.

What is claimed is:

1. An information processing method, comprising:
    sending, by a source base station, a communication message that comprises instruction information to a user equipment (UE), so that the UE records multiple times, according to the instruction information, signal quality parameters of cells measured by the UE; and
    after establishing a connection between the UE and a target base station:
        informing the target base station that the UE has information related to a radio link failure, a handover failure, or a handover success;
        requesting, by the target base station, from the UE the information related to the radio link failure, the handover failure, or the handover success;
        sending the signal quality parameters of the cells measured by the UE to the target base station; and
        receiving, by the source base station, the signal quality parameters of the cells measured by the UE, recorded by the UE multiple times, and sent by the target base station, and
    adjusting, by the source base station, handover parameters according to the received signal quality parameters.

2. The method according to claim 1, wherein:
    the instruction information comprises a recording period and the number of records, or a recording period and a recording duration, or a recording duration; or
    the instruction information comprises an instruction identifier, wherein the instruction identifier is used to instruct the UE to record multiple times, according to set recording information, the signal quality parameters of the cells measured by the UE, wherein the recording information comprises a recording period and the number of records, or a recording period and a recording duration, or a recording duration.

3. The method according to claim 2, wherein:
    the recording period is a predetermined first period; or the recording period is N times a reporting period of the UE, wherein the reporting period is a reporting period from a physical layer to a radio resource management layer of the UE and N is an integer greater than or equal to 1.

4. The method according to claim 3, wherein:
    when the recording period is N times the reporting period of the UE, the instruction information is further used to instruct the UE to record and report time information each time when the UE records the signal quality parameters or used to instruct the UE to report the reporting period of the UE.

5. The method according to claim 1, wherein:
    the instruction information is further used to instruct the UE to record and report time information and position information of the UE each time when the UE records the signal quality parameters.

6. The method according to claim 1, wherein the communication message is a radio resource control protocol RRC connection reconfiguration message.

7. The method according to claim 1, wherein the establishing a connection between the UE and a target base station comprises: establishing an RRC connection between the UE and the target base station,
    wherein the RRC connection comprises: an RRC connection established when the UE and the target base station perform an RRC reestablishment or an RRC establishment after a radio link failure or a handover failure occurs to the UE; or an RRC connection established when the UE is handed over to the target base station successfully.

8. An information processing method, comprising:
    receiving a communication message that comprises instruction information and is sent by a source base station;
    recording multiple times, according to the instruction information, signal quality parameters of cells measured by a UE;
    establishing a connection between the UE and a target base station;
    informing the target base station that the UE has information related to a radio link failure, a handover failure, or a handover success;
    receiving a request from the target base station for the information related to a radio link failure, a handover failure, or a handover success; and
    sending the signal quality parameters of the cells measured by the UE and recorded multiple times to a target base station, to thereby cause the target base station to send the signal quality parameters of the cells measured by the UE and recorded multiple times to the source base station.

9. The method according to claim 8, wherein:
    the instruction information comprises a recording period and the number of records, or a recording period and a recording duration, or a recording duration; or
    the instruction information comprises an instruction identifier, wherein the instruction identifier is used to instruct the UE to record multiple times, according to set recording information, the signal quality parameters of the cells measured by the UE, wherein the recording information comprises a recording period and the number of records, or a recording period and a recording duration, or a recording duration.

10. The method according to claim 9, wherein:
    the recording period is a predetermined first period; or the recording period is N times a reporting period of the UE, wherein the reporting period is a reporting period from a physical layer to a radio resource management layer of the UE and N is an integer greater than or equal to 1.

11. The method according to claim 10, wherein when the recording period is N times the reporting period of the UE, the signal quality parameters of the cells measured by the UE recorded multiple times and sent to the target base station, comprise time information of each record or the reporting period of the UE.

12. The method according to claim 8, wherein the signal quality parameters of the cells measured by the UE recorded multiple times and sent to the target base station, comprises time information and position information of the UE each time when the UE records the signal quality parameters.

13. The method according to claim 8, wherein the communication message is a radio resource control protocol RRC connection reconfiguration message.

14. The method according to claim 8, wherein the sending the signal quality parameters of the cells measured by the UE and recorded multiple times to a target base station comprises: sending the signal quality parameters of the cells measured by the UE and recorded multiple times to a target base station in a process or upon the completion of establishing an RRC connection between the UE and the target base station,
   wherein the RRC connection comprises: an RRC connection established when the UE and the target base station perform an RRC reestablishment or an RRC establishment after a radio link failure or a handover failure occurs to the UE; or an RRC connection established when the UE is handed over to the target base station successfully.

15. A user equipment (UE), comprising:
   a receiver, configured to receive a communication message that comprises instruction information and is sent by a source base station;
   a processor, configured to record multiple times, in response to and according to the instruction information, signal quality parameters of cells measured by the UE; and
   a transmitter, configured to:
      establish a connection between the UE and a target base station;
      inform the target base station that the UE has information related to a radio link failure, a handover failure, or a handover success;
      upon the receiver further receiving a request, sent by the target base station, for the information related to the radio link failure, the handover failure, or the handover success, send the signal quality parameters of the cells measured by the UE and recorded multiple times to the target base station, to thereby cause the target base station to send the signal quality parameters of the cells measured by the UE and recorded multiple times to the source base station.

16. A system comprising:
   a source base station;
   a target base station;
   a user equipment (UE), the UE comprising:
      a receiver configured to receive a communication message that comprises instruction information and is sent by the source base station,
      at least one hardware processor configured to record multiple times, in response to and according to the instruction information, signal quality parameters of cells measured by the UE, and
      a transmitter configured to:
         establish a connection between the UE and the target base station;
         upon the receiver further receiving a request, sent by the target base station, for the information related to the radio link failure, the handover failure, or the handover success, send the signal quality parameters of the cells measured by the UE and recorded multiple times to the target base station, to thereby cause the target base station to send the signal quality parameters of the cells measured by the UE and recorded multiple times to the source base station.

* * * * *